United States Patent
Schönrock et al.

(10) Patent No.: US 12,221,570 B2
(45) Date of Patent: Feb. 11, 2025

(54) PROCESS FOR PRODUCING A PRESSURE-SENSITIVE ADHESIVE BASED ON ACRYLONITRILE-BUTADIENE RUBBER AND ADHESIVE TAPE COMPRISING SAID ADHESIVE

(71) Applicant: TESA SE, Norderstedt (DE)

(72) Inventors: Julia Schönrock, Hamburg (DE); CaiRong Lim, Hamburg (DE); Yeliz Tepe, Hamburg (DE)

(73) Assignee: Tesa SE, Norderstedt (DE)

( * ) Notice: Subject to any disclaimer, the term of this patent is extended or adjusted under 35 U.S.C. 154(b) by 695 days.

(21) Appl. No.: 17/416,751

(22) PCT Filed: Dec. 17, 2019

(86) PCT No.: PCT/EP2019/085757
§ 371 (c)(1),
(2) Date: Jun. 21, 2021

(87) PCT Pub. No.: WO2020/127351
PCT Pub. Date: Jun. 25, 2020

(65) Prior Publication Data
US 2022/0073791 A1   Mar. 10, 2022

(30) Foreign Application Priority Data

Dec. 19, 2018 (DE) .................. 10 2018 222 373.4
Dec. 20, 2018 (DE) .................. 10 2018 222 679.2

(51) Int. Cl.
*C09J 7/38* (2018.01)
*C09J 7/25* (2018.01)

(52) U.S. Cl.
CPC .............. *C09J 7/383* (2018.01); *C09J 7/255* (2018.01); *C09J 2203/326* (2013.01); *C09J 2301/122* (2020.08); *C09J 2301/124* (2020.08); *C09J 2301/302* (2020.08); *C09J 2409/00* (2013.01); *C09J 2467/006* (2013.01)

(58) Field of Classification Search
CPC ...... C09J 7/383; C09J 7/255; C09J 2301/122; C09J 2203/326; C09J 2301/302; C09J 2409/00; C09J 2467/006; C09J 2301/416
See application file for complete search history.

(56) References Cited

U.S. PATENT DOCUMENTS

| | | |
|---|---|---|
| 4,133,731 A | 1/1979 | Hansen et al. |
| 4,331,718 A | 5/1982 | Gleichechagen et al. |
| 4,820,746 A | 4/1989 | Rice et al. |
| 7,833,576 B2 | 11/2010 | Storbeck et al. |
| 2004/0047985 A1 | 3/2004 | Storbeck et al. |
| 2009/0181250 A1 | 7/2009 | Zmarsly et al. |
| 2014/0044960 A1 | 2/2014 | Guenzler et al. |
| 2016/0032150 A1 | 2/2016 | Guenzler et al. |
| 2016/0083549 A1 | 3/2016 | Zmarsly et al. |
| 2018/0230342 A1* | 8/2018 | Pütz ................. C09J 109/02 |
| 2019/0375909 A1 | 12/2019 | Czeronatis et al. |
| 2020/0010732 A1 | 1/2020 | Salert et al. |
| 2020/0153001 A1 | 5/2020 | Keite-Telgenbuescher et al. |

FOREIGN PATENT DOCUMENTS

| | | |
|---|---|---|
| DE | 28 45 541 A1 | 6/1980 |
| DE | 38 34 879 A1 | 4/1990 |
| DE | 10 2008 004 388 A1 | 7/2009 |
| DE | 10 2015 215 247 A1 | 2/2017 |
| DE | 10 2017 206 083 A1 | 10/2018 |
| DE | 10 2017 221 039 A1 | 5/2019 |
| EP | 0 447 855 A2 | 9/1991 |
| EP | 1 332 192 B1 | 5/2006 |
| JP | 2003193007 A * | 7/2003 ........... B05C 1/0813 |
| WO | 2018/153618 A1 | 8/2018 |

OTHER PUBLICATIONS

Hirsch, JP-2003193007, Sep. 7, 2003 English translation.

\* cited by examiner

*Primary Examiner* — Daniel McNally
(74) *Attorney, Agent, or Firm* — Norris McLaughlin, P.A.

(57) ABSTRACT

A process for producing a cured pressure-sensitive adhesive that comprises a composition including at least one solid acrylonitrile-butadiene rubber, at least one tackifier resin, and optionally at least one liquid acrylonitrile-butadiene rubber, comprises subjecting the composition to electron-beam irradiation (EBC) with an acceleration voltage of 1.8 to 2.38 kV per 1 pm layer thickness of the composition and with a total beam dose of 5 to 50 kGy. Also disclosed is a cured pressure-sensitive adhesive obtained or obtainable by the process. Further disclosed is a double-sidedly adhering, especially carrierless, adhesive tape, and also single- or double-sidedly adhering adhesive tape comprising, on a carrier layer, the cured pressure-sensitive adhesive. Disclosed finally is the use of the pressure-sensitive adhesive or of an adhesive tape made therefrom for bonding components in electronic devices, especially in mobile electronic devices, preferably tablets, mobile phones or smart watches.

16 Claims, No Drawings

PROCESS FOR PRODUCING A PRESSURE-SENSITIVE ADHESIVE BASED ON ACRYLONITRILE-BUTADIENE RUBBER AND ADHESIVE TAPE COMPRISING SAID ADHESIVE This application is a 371 of PCT/EP2019/085757, filed Dec. 17, 2019, which claims foreign priority benefit under 35 U.S.C. § 119 of the German Patent Application No. 10 2018 222 679.2, filed Dec. 20, 2018, and German Patent Application No. 2018 222 373.4, filed Dec. 19, 2018, the disclosures of which are incorporated herein by reference.

The present invention relates to a method of producing a cured pressure-sensitive adhesive from a composition comprising at least one solid acrylonitrile-butadiene rubber, at least one tackifier resin and optionally at least one liquid acrylonitrile-butadiene rubber, wherein the composition is subjected to electron beam irradiation (EBI) with an acceleration voltage per 1 μm of layer thickness of the composition of 1.8 to 2.38 KV and a total radiation dose of 5 to 50 kGy. The present invention further relates to a cured pressure-sensitive adhesive obtained or obtainable by the method of the invention. The present invention additionally relates to a single- or double-sided adhesive tape comprising a cured pressure-sensitive adhesive obtainable in accordance with the invention on a carrier layer. The present invention finally relates to the use of the pressure-sensitive adhesive obtainable in accordance with the invention or of an adhesive tape of the invention for bonding of components in electronic devices, especially in mobile electronic devices, preferably tablets, mobile phones or smartwatches.

STATE OF THE ART

Pressure-sensitive adhesives have long been known. Pressure-sensitive adhesives refer to adhesives that permit a sustained bond to the substrate even under relatively weak contact pressure and can be parted again from the substrate essentially without residue after use. Pressure-sensitive adhesives have permanent pressure-sensitive adhesiveness at room temperature, i.e. have sufficiently low viscosity and high contact tackiness, such that they wet the surface of the respective bond substrate even at low contact pressure. The bondability of the adhesives and their redetachability are based on their adhesive and cohesive properties. Various compounds form a possible basis for pressure-sensitive adhesives.

Adhesive tapes that have been provided with pressure-sensitive adhesives (also referred to as pressure-sensitive adhesive tapes) are nowadays used in various ways in the industrial and domestic sector. Pressure-sensitive adhesive tapes typically consist of a carrier film provided with a pressure-sensitive adhesive on one or both sides. There are also pressure-sensitive adhesive tapes that consist exclusively of a pressure-sensitive adhesive layer and no carrier film, called transfer tapes. The composition of the pressure-sensitive adhesive tapes may be very different and is guided by the respective requirements of the different applications. The carriers typically consist of polymer films, for example polypropylene, polyethylene, polyester, or else of paper or woven or nonwoven fabric.

The self-adhesives or pressure-sensitive adhesives typically consist of acrylate copolymers, silicones, natural rubber, synthetic rubber, styrene block copolymers or polyurethanes.

Acrylonitrile-butadiene rubber (also called NBR or nitrile-butadiene rubber) refers to a synthetic rubber which is obtained by copolymerization of acrylonitrile and buta-1,3-diene in mass ratios of about 52:48 to 10:90. It is produced virtually exclusively in aqueous emulsion. The resulting emulsions are used as such (NBR latex) or processed to give a solid-state rubber. The properties of the nitrile rubber depend on the ratio of the starting monomers and on its molar mass. The vulcanizates obtainable from nitrile rubber have high stability to fuels, oils, fats and hydrocarbons, and feature more favorable aging characteristics, lower abrasion and reduced gas permeability compared to those made from natural rubber. By contrast, their weathering resistance is comparatively poor.

A wide range of acrylonitrile-butadiene rubbers are available. The different types are distinguished by the acrylonitrile content, but especially also by the viscosity of the rubber. This is typically specified by the Mooney viscosity. This in turn is determined firstly by the number of chain branches in the polymer and secondly by the molecular weight. In principle, the polymerization is distinguished between what is called cold polymerization and hot polymerization. Cold polymerization is typically effected at temperatures of 5 to 15° C. and, by comparison with hot polymerization which is typically conducted at 30 to 40° C., leads to a smaller number of chain branches.

NBR rubbers are obtainable from a multitude of manufacturers, for example Nitriflex, Zeon, LG Chemicals, Kumho Petrochemicals and Arlanxeo.

Carboxylated NBR grades are formed by terpolymerization of acrylonitrile and butadiene with small proportions of (meth)acrylic acid in emulsion. They are notable for high strength. The selective hydrogenation of the C, C double bond of NBR leads to hydrogenated nitrile rubbers (H—NBR) having improved stability to increasing temperature (up to 150° C. in hot air or ozone) or swelling agents (for example sulfur-containing crude oils, brake fluids or hydraulic fluids). Vulcanization is effected with customary sulfur crosslinkers or peroxides, or by means of high-energy radiation.

As well as carboxylated or hydrogenated NBR rubbers, there are also liquid NBR rubbers. These are limited in their molecular weight by the addition of chain transfer agents during the polymerization, and are therefore obtained as liquid rubbers.

For establishment of application-appropriate properties, pressure-sensitive adhesives can be modified by admixing with tackifier resins, plasticizers, crosslinkers or fillers.

Fillers are used, for example, for increasing the cohesion of a pressure-sensitive adhesive. It is frequently the case that a combination of filler/filler interactions and filler/polymer interactions leads to the desired reinforcement of the polymer matrix.

Fillers are also added to paper, to plastics and to adhesives and paints and to other products in order to increase weight or volume. The addition of filler often improves the industrial usability of the products, and influences their quality, for example strength, hardness etc. The natural, inorganic and organic fillers such as calcium carbonate, kaolin, dolomite and the like are produced mechanically.

Even in the case of rubber and synthetic elastomers, suitable fillers can improve quality, for example hardness, strength, elasticity and elongation. Many commonly used fillers are carbonates, especially calcium carbonate, but also silicates (talc, clay, mica), siliceous earth, calcium sulfate and barium sulfate, aluminum hydroxide, glass fibers and beads, and carbon blacks.

It is also possible to distinguish inorganic and organic fillers by their density. For instance, the inorganic fillers that are often used in plastics and also adhesives, such as chalk, titanium dioxide, calcium sulfate and barium sulfate, increase the density of the composite since they themselves have a density higher than that of the polymer. Given the same layer thickness, the weight per unit area is then higher.

In addition, there are fillers that can reduce the overall density of the composite. These include hollow microbeads, which are very voluminous lightweight fillers. The beads are filled with air, nitrogen or carbon dioxide; the bead shells consist of glass, or else of a thermoplastic in the case of some products.

As well as fillers, the pressure-sensitive adhesives may also contain what are called plasticizers. Examples of plasticizers include low molecular polyacrylates, tackifier resins, phosphates or polyphosphates, paraffinic and naphthenic oils, oligomers such as oligobutadienes and -isoprenes, liquid terpene resins, vegetable and animal oils and fats. Plasticizing resins may have the same chemical basis as the tackifier resins listed below, but differ therefrom by their softening point, which is <40° C.

For the purpose of improved processability of rubbers, for example the pelletizing of pellets from large rubber bales prior to further processing in mixers, inert separating auxiliaries are added to the rubber, such as talc, silicates (talc, clay, mica), zinc stearate and PVC powder.

As electronic devices become increasingly widespread, they are being used in an increased number of fields. This also results in growing demands on the assembled components. For instance, as a result of the development of bodyworn electronic devices (called wearables), for instance smartwatches, it is becoming ever more important that the bonds used therein have high resistance to various chemicals and do not lose peel adhesion even after prolonged storage in various media. Similar demands are also increasingly being made on different electronic devices such as smartphones (mobile phones), tablets, notebooks, cameras, video cameras, keyboards, touchpads and the like.

Electronic, optical and precision-mechanical devices in the context of this application are especially those devices as classified in Class 9 of the International Classification of Goods and Services for the Registration of Marks (Nice classification); 10th edition (NCL (10-2013)), to the extent that these are electronic, optical or precision-mechanical devices, and also clocks and time-measuring devices according to Class 14 (NCL (10-2013)), such as, in particular, scientific, marine, surveying, photographic, film, optical, weighing, measuring, signaling, monitoring, rescuing, and instruction apparatus and instruments;
apparatus and instruments for conducting, switching, converting, storing, regulating and monitoring electricity;
image recording, processing, transmission, and reproduction devices, such as televisions and the like;
acoustic recording, processing, transmission, and reproduction devices, such as broadcasting devices and the like;
computers, calculating instruments and data-processing devices, mathematical devices and instruments, computer accessories, office instruments—for example, printers, faxes, copiers, typewriters, data-storage devices;
telecommunications devices and multifunction devices with a telecommunications function, such as telephones and answering machines;
chemical and physical measuring devices, control devices, and instruments, such as battery chargers, multimeters, lamps, and tachometers;
nautical devices and instruments;
optical devices and instruments;
medical devices and instruments and those for sportspeople;
clocks and chronometers;
solar cell modules, such as electrochemical dye solar cells, organic solar cells, and thin-film cells;
fire-extinguishing equipment.

Technical development is increasingly being directed to those devices that are being made ever smaller and lighter, such that they can be carried by their user at any time, and are typically carried on a regular basis. This is typically accomplished by implementation of lower weights and/or suitable size of such devices. In the context of this document, such devices are also referred to as mobile devices or portable devices. In this trend of development, precision-mechanical and optical devices are increasingly (also) being provided with electronic components, which increases the miniaturization possibilities. On account of the carrying of the mobile devices, these are subjected to increased stresses—especially mechanical and chemical stresses—for instance as a result of being knocked against edges, by being dropped, by contact with other hard objects in the pocket, but also merely by permanent movement as a result of being carried per se. But mobile devices are also subjected to greater stresses on account of contact with moisture, temperature effects and the like compared to "immobile" devices that are typically installed indoors and are barely moved, if at all. The adhesive used in accordance with the invention has been found to be particularly preferable for withstanding such disruptive influences and ideally also for attenuating them or compensating for them.

The invention accordingly relates more preferably to mobile devices since the adhesive used in accordance with the invention here is of particular benefit on account of its unexpectedly good properties. Some portable devices are listed hereinafter, without wishing to unnecessarily restrict the subject matter of the invention by virtue of the specific representatives mentioned in this list:

cameras, digital cameras, photography accessories (such as light meters, flashguns, diaphragms, camera casings, lenses, etc.), film cameras, video cameras
small computers (mobile computers, handheld computers, handheld calculators), laptops, notebooks, netbooks, ultrabooks, tablet computers, handhelds, electronic diaries and organizers (called "electronic organizers" or "personal digital assistants", PDAs, palmtops), modems,
computer accessories and operating units for electronic devices, such as mice, drawing pads, graphics tablets, microphones, loudspeakers, games consoles, gamepads, remote controls, remote operating devices, touchpads
monitors, displays, screens, touch-sensitive screens (sensor screens, touchscreen devices), projectors
reading devices for electronic books ("E-books")
mini TVs, pocket TVs, devices for playing films, video players
radios (including mini and pocket radios), Walkmans, Discmans, music players for e.g. CDs, DVDs, Blu-ray, cassettes, USB, MP3, headphones
cordless telephones, cellphones, smartphones, two-way radios, hands-free telephones, devices for summoning people (pagers, bleepers)
mobile defibrillators, blood sugar meters, blood pressure monitors, step counters, pulse meters
torches, laser pointers mobile detectors, optical magnifiers, binoculars, night vision devices GPS devices, navigation devices, portable interface devices for satellite communications data storage devices (USB sticks, external hard drives, memory cards)

wristwatches, digital watches, pocket watches, chain watches, stopwatches.

Since the pressure-sensitive adhesive tapes that are used in such applications can also come into contact with cleaning fluids and other chemicals (for example sebum, oleic acid, perfume, suncream, etc.), it is necessary to use chemical-resistant pressure-sensitive adhesives. In principle, high stability to chemicals of the same polarity can easily be achieved. However, it is much more demanding to achieve high stability to chemicals of different polarity, especially to nonpolar compounds such as sebum or oleic acid.

Published specification DE 3834879 A discloses pressure-sensitive adhesives based on acrylonitrile-butadiene rubber (NBR rubber) that contain a phenolic resin as tackifier resin and can be cured by means of EBC (electron beam curing). However, these pressure-sensitive adhesives do not have adequate stability to chemicals.

Furthermore, published specification DE 10 2015 215 247 A1 discloses pressure-sensitive adhesives based on acrylonitrile-butadiene rubbers and tackifier resins, wherein tackifier resins used may also be modified aromatic hydrocarbon resins. There is no disclosure in this document of curing of these pressure-sensitive adhesives by means of EBC. Nor do these adhesives have sufficient stability to chemicals, shock resistance and shear.

OBJECT OF THE INVENTION

It was accordingly an object of the present invention to produce a pressure-sensitive adhesive that has improved stability to chemicals, especially to polar and nonpolar compounds, with simultaneously improved shock resistance and shear. This pressure-sensitive adhesive was intended to show the profile of properties of customary pressure-sensitive adhesives and to be producible inexpensively. A further object of the present invention was that of providing a single- or double-sided adhesive tape comprising the pressure-sensitive adhesive produced. In addition, it was an object of the present invention to provide a pressure-sensitive adhesive or an adhesive tape containing the pressure-sensitive adhesive, which is suitable for bonding of components in electronic devices, especially in mobile electronic devices, preferably tablets, mobile phones or smartwatches.

Achievement of the Object

The object is achieved by a method of producing a cured pressure-sensitive adhesive from a composition comprising
a) at least one solid acrylonitrile-butadiene rubber
b) at least one tackifier resin and
c) optionally at least one liquid acrylonitrile-butadiene rubber,
characterized in that the composition is subjected to electron beam irradiation (EBI) with an acceleration voltage per 1 µm of layer thickness of the composition of 1.8 to 2.38 kV and a total radiation dose of 5 to 50 kGy to obtain the cured pressure-sensitive adhesive.

The object is additionally achieved by a cured pressure-sensitive adhesive obtained or obtainable by the method of the invention.

The pressure-sensitive adhesive obtainable in accordance with the invention may be used by way of example in the form of a carrier-free or carrier-containing pressure-sensitive adhesive tape. The invention thus further relates to a single- or double-sided adhesive tape, comprising a cured pressure-sensitive adhesive obtainable in accordance with the invention on a carrier layer.

The invention additionally relates to a double-sided adhesive tape comprising a cured pressure-sensitive adhesive obtainable in accordance with the invention, wherein the double-sided adhesive tape is especially in a carrier-free configuration.

The object is finally achieved by the use of a cured pressure-sensitive adhesive of the invention or of an adhesive tape of the invention for bonding of components in electronic devices, especially in mobile electronic devices, preferably tablets, mobile phones or smartwatches.

The invention is based on the finding that stability to chemicals, especially both to nonpolar substances such as oleic acid and sebum and to polar compounds such as water or methanol, can be increased by the irradiation of the pressure-sensitive adhesive with electron beams (EBC), but without adversely affecting peel adhesion. The electron beams (EBC) can additionally increase the shock resistance and stability to shear of the pressure-sensitive adhesive. Owing to the high stability to chemicals and the high peel adhesion, shock resistance and stability to shear, a sustainable and durable bond is possible in bonds that come into contact with chemicals and/or are subjected to impacts and/or shear. This makes the pressure-sensitive adhesive of the invention suitable especially for the bonding of parts in electronic devices.

DETAILED DESCRIPTION OF THE INVENTION

In the method of the invention for producing a cured pressure-sensitive adhesive, a composition comprising at least one solid acrylonitrile-butadiene rubber, at least one tackifier resin and optionally at least one liquid acrylonitrile-butadiene rubber is cured by electron beam irradiation (EBI) with an acceleration voltage per 1 µm of layer thickness of the composition of 1.8 to 2.38 KV and a total radiation dose of 5 to 50 kGy.

The composition can be irradiated, for example, using a system from ELECTRON CROSSLINKING AB (Halmstad, Sweden). The composition is typically subjected to irradiation with electrons from both sides, i.e. symmetrically, in order to assure homogeneous curing. This is advantageous especially in the case of relatively high thicknesses of the composition to be irradiated. In the case of thin compositions of thickness 50 µm, for example, single-sided irradiation is also possible. Preference is given to removing the liner before the irradiation on the corresponding side, especially in order to avoid attenuation of radiation and damage to the liner. The result of the latter may especially be that the liner can no longer be removed from the pressure-sensitive adhesive after the irradiation. Given suitable technical design, the irradiation process can be effected inline or in one step in the production process for the cured pressure-sensitive adhesive.

Advantageously in accordance with the invention, the acceleration voltage per 1 µm of layer thickness of the composition is 1.9 to 2.3 kV, preferably 1.96 to 2.24 kV, especially 2 kV. The use of the aforementioned acceleration voltage leads to an improvement in chemical resistance, shock resistance and stability to shear, but without adversely affecting peel adhesion. The use of higher or lower acceleration voltages does not lead to improved chemical resistance and/or shock resistance and/or shear resistance.

In addition, it is preferable in accordance with the invention when the compositions are cured using a particular radiation dose. It is therefore advantageous in accordance with the invention when the total radiation dose is 5 to 40 kGy, preferably 5 to 30 kGy, more preferably 5 to 20 kGy, especially 15 kGy. The above-cited total radiation dose is based on the sum total of all radiation doses with which the composition has been cured. Accordingly, it is possible in accordance with the invention to cure the composition either by irradiation with multiple beam doses or by irradiation with just one beam dose, with the sum total of all beam doses in the case of curing by multiple beam doses corresponding to the above-specified total radiation dose.

As a first obligatory constituent, the composition to be cured contains at least one solid acrylonitrile-butadiene rubber (a). Acrylonitrile-butadiene rubber (also referred to as nitrile rubber or NBR) is understood in accordance with the invention to mean a copolymer of acrylonitrile and 1,3-butadiene that can also be described by the general formula

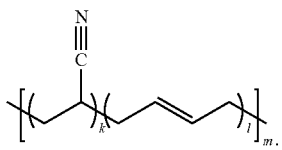

The NBR can be produced by a free-radical polymerization (chain polymerization) from the acrylonitrile and 1,3-butadiene monomers in the emulsion polymerization process. The reaction can be performed at various temperatures, giving rise to a significantly or less significantly crosslinked nitrile rubber. The crosslinking level of NBR is lower in the case of cold polymerization at 5° C., higher in the case of warm polymerization at 25° C.-50° C.

It is a feature of solid acrylonitrile-butadiene rubbers that they have a glass transition temperature $T_g$ of less than $-30°$ C., preferably of less than $-35°$ C., especially of less than $-40°$ C. Glass transition temperature can be determined by means of DSC to DIN 53 765:1994, section 7.1, note 1.

It is possible to add inert separating auxiliaries to the solid acrylonitrile-butadiene rubbers, such as talc, silicates (talc, clay, mica), zinc stearate and PVC powder. The separating auxiliaries are preferably selected from the group consisting of talc, silicates (talc, clay, mica), zinc stearate and PVC powder. It is additionally possible with preference to add thermoplastic elastomers, for example synthetic rubbers, to the solid acrylonitrile-butadiene rubber in a proportion of up to 5% by weight, based on the total amount of solid acrylonitrile-butadiene rubber, in order to improve processibility. Representative types that should be mentioned here are in particular styrene-isoprene-styrene (SIS) and styrene-butadiene-styrene (SBS), which are particularly compatible.

According to the invention, a solid acrylonitrile-butadiene rubber produced by means of cold polymerization is used, and has a Mooney viscosity of 55 to 70 MU (determinable, for example, according to DIN ISO 289-1:2018-12) and a $T_g$ of $-42°$ C. Such a rubber is commercially available, for example, under the Nipol N 917 trade name from Zeon Europe GmbH.

Advantageously in accordance with the invention, the cured pressure-sensitive adhesive is produced using solid acrylonitrile-butadiene rubbers having a particular acrylonitrile content. It is therefore particularly advantageous in accordance with the invention when the at least one solid acrylonitrile-butadiene rubber (a) has an acrylonitrile content of 20% to 40% by weight, preferably of 20% to 30% by weight, especially of 20% to 25% by weight, based in each case on the total weight of the solid acrylonitrile-butadiene rubber. The use of the at least one solid acrylonitrile-butadiene rubber with the above-cited acrylonitrile content leads to improved chemical resistance compared to the use of solid acrylonitrile-butadiene rubbers having a lower acrylonitrile content.

The composition used for production of the cured pressure-sensitive adhesive contains the at least one solid acrylonitrile-butadiene rubber preferably in a total amount of 50 to 80 parts by weight, preferably of 55 to 75 parts by weight, especially of 62 to 67 parts by weight, where the parts by weight of (a), (b) and (c) are normalized such that (a)+ (b)+ (c) adds up to 100. The use of the at least one solid acrylonitrile-butadiene rubber in the aforementioned total amounts in combination with the tackifier resin (b) and optionally the liquid acrylonitrile-butadiene rubber (c) leads to particularly high chemical resistance and shock resistance after curing by electron beam irradiation (EBI), but without adversely affecting peel adhesion.

As a second essential constituent, the composition of the invention comprises at least one tackifier resin (b). The term "tackifier resin" is understood by the person skilled in the art to mean a resin-based substance that increases the tack of the composition.

Tackifier resins used may, for example, be hydrogenated and unhydrogenated hydrocarbon resins and polyterpene resins. Preferentially suitable examples include hydrogenated polymers of dicyclopentadiene (for example Escorez 5300 series; Exxon Chemicals), hydrogenated polymers of preferably $C_8$ and $C_9$ aromatics (for example Regalite and Regalrez series; Eastman Inc. or Arkon P series; Arakawa). These may result from pure aromatic streams via hydrogenation of polymers or else be based on the basis of mixtures of different aromatics via hydrogenation of polymers. Also suitable are partly hydrogenated polymers of $C_8$ and $C_9$ aromatics (for example Regalite and Regalrez series; Eastman Inc. or Arkon M; Arakawa), hydrogenated polyterpene resins (for example Clearon M; Yasuhara), hydrogenated $C_5/C_9$ polymers (for example ECR-373; Exxon Chemicals), aromatic-modified selectively hydrogenated dicyclopentadiene derivatives (for example Escorez 5600 series; Exxon Chemicals). The aforementioned tackifier resins may be used either alone or in a mixture.

Particularly suitable hydrogenated hydrocarbon resins are described, for example, in EP 0 447 855 A1, U.S. Pat. Nos. 4,133,731 A and 4,820,746 A, since the absence of double bonds means that crosslinking cannot be disrupted.

In addition, it is alternatively possible to use unhydrogenated resins if crosslinking promoters, for example polyfunctional acrylates, are used. It is also possible to use other unhydrogenated hydrocarbon resins, or unhydrogenated analogs of the above-described hydrogenated resins.

It is additionally possible to use rosin-based resins (for example Foral, Foralyn). The aforementioned rosins include, for example, natural rosin, polymerized rosin, partly hydrogenated rosin, fully hydrogenated rosin, esterified products of these types of rosin (such as glycerol esters, pentaerythritol esters, ethylene glycol esters and methyl esters) and rosin derivatives (such as disproportionated rosin, fumaric acid-modified rosin and lime-modified rosin).

The tackifier resins are optionally polyterpene resins based on α-pinene and/or β-pinene and/or δ-limones or terpene-phenol resins.

It is possible to use any combinations of these in order to adjust the properties of the resulting pressure-sensitive adhesive as desired. Express reference is made to the description of the state of knowledge in the "Handbook of Pressure Sensitive Adhesive Technology" by Donatas Satas (van Nostrand, 1989).

More preferably, the at least one tackifier resin (b) is a modified aromatic hydrocarbon resin. The use of such tackifier resins in combination with the solid acrylonitrile-butadiene rubber (a) and optionally the liquid acrylonitrile-butadiene rubber (c), after curing of the composition by electron beam irradiation (EBI), leads to particularly high chemical resistance, shock resistance and shear resistance, but without adversely affecting peel adhesion.

The modified aromatic hydrocarbon resin is most preferably a resin obtainable by copolymerization of aliphatic monomers having 5 carbon atoms with at least one aromatic monomer. An example of such a resin is commercially available under the Pico AR 100 trade name from Eastman Chemical Company.

It has been found to be advantageous in accordance with the invention when the at least one tackifier resin (b), preferably the modified aromatic hydrocarbon resin, especially a hydrocarbon resin obtainable by copolymerization of at least one monomer having 5 carbon atoms with at least one aromatic monomer, is present in the composition in a particular total amount. It is therefore preferable when the composition contains the at least one tackifier resin (b), especially the modified aromatic hydrocarbon resin, in a total amount of 20 to 50 parts by weight, preferably of 25 to 45 parts by weight, especially of 27 to 34.5 parts by weight, where the parts by weight of (a), (b) and (c) are normalized such that (a)+ (b)+ (c) adds up to 100. The use of the at least one tackifier resin (b), preferably of the modified aromatic hydrocarbon resin, especially of the hydrocarbon resin obtainable by copolymerization of at least one monomer having 5 carbon atoms with at least one aromatic monomer, in the above-cited total amounts in combination with the above-cited solid acrylonitrile-butadiene rubber (a) and optionally the liquid acrylonitrile-butadiene rubber (c) described hereinafter, after curing by electron beam irradiation (EBI), leads to particularly high chemical resistance, shock resistance and shear resistance, but without adversely affecting the peel adhesion of the cured pressure-sensitive adhesive.

As well as the obligatory constituents (a) and (b), the composition may further comprise at least one liquid acrylonitrile-butadiene rubber (c). According to the invention, a liquid acrylonitrile-butadiene rubber is understood to mean an acrylonitrile-butadiene rubber having a glass transition temperature $T_g$ of more than −30° C., preferably of more than −25° C. The glass transition temperature $T_g$ can be determined as described above in connection with the solid acrylonitrile-butadiene rubber. The liquid NBR likewise has the above-described general formula, but is obtainable preferably by warm polymerization at 25° C.-50° C. and hence is more highly crosslinked than the solid NBR (a). Preference is given to using liquid acrylonitrile-butadiene rubbers having a Brookfield viscosity of 9000 to 30 000 mPa*s, especially 9000 to 16 000 mPa*s (in each case measured with spindle 4, 12 rpm, 50° C.). A liquid NBR used with particular preference is commercially available as the commercial product Nipol 1312 LV from Zeon Chemical GmbH. The addition of the liquid NBR (c) during the irradiation leads to crosslinking of the composition and hence results in an improvement in shock resistance of the cured pressure-sensitive adhesive.

Advantageously in accordance with the invention, the at least one liquid acrylonitrile-butadiene rubber has a particular acrylonitrile content. Preferred embodiments of the first subject of the invention are therefore characterized in that the at least one liquid acrylonitrile-butadiene rubber (c) has an acrylonitrile content of 25% to 45% by weight, preferably of 25% to 40% by weight, especially of 28% to 35% by weight, based in each case on the total weight of the liquid acrylonitrile-butadiene rubber. The use of such liquid acrylonitrile-butadiene rubbers (c) in combination with the above-described solid NBR and tackifier resin, after curing by electron beam irradiation (EBI), leads to an improvement in shock resistance, but without adversely affecting peel adhesion or chemical resistance.

The at least one liquid acrylonitrile-butadiene rubber (c) is preferably present in a total amount of 1 to 10 parts by weight, preferably of 1 to 8 parts by weight, especially of 2.5 to 6 parts by weight, where the parts by weight of (a), (b) and (c) are normalized such that (a)+ (b)+ (c) adds up to 100. The addition of the liquid NBR in the above-cited total amounts leads to an improvement in shock resistance of the cured pressure-sensitive adhesive, but without adversely affecting chemical resistance and peel adhesion.

It is possible to add further polymers, such as synthetic rubbers and/or thermoplastic elastomers, to the composition for adjustment of optical and adhesive properties of the cured pressure-sensitive adhesive. Preferably in accordance with the invention, however, the composition does not contain any further polymers aside from the obligatory constituents (a) and (b) and the optional components (c). It is therefore preferable when the composition contains polymers other than components (a) to (c) in a total amount of 0 to 5 parts by weight, preferably of 0 to 2 parts by weight, especially of 0 parts by weight, based in each case on (a)+ (b)+ (c)=100.

In addition, it may also be the case that the composition additionally comprises at least one compound (d) selected from the group consisting of crosslinking promoters, aging agents, separating agents, fillers, dyes, plasticizers and mixtures thereof.

Crosslinking promoters may be used for an increase in the radiation yield during electron beam curing. Crosslinking promoters used may, for example, be crosslinking promoters based on polyfunctional acrylates or thiols. However, it has been found that, surprisingly, the composition can be cured even without additional crosslinking promoter by irradiation with electrons and, after curing, has high stability to chemicals and shear and high shock resistance. The omission of the crosslinking promoter lowers the costs and complexity in the production of the cured pressure-sensitive adhesive of the invention. Preference is therefore given to using no crosslinking promoters in the method of the invention.

Additives utilized are typically:
  primary antioxidants, for example sterically hindered phenols
  secondary antioxidants, for example phosphites or thioethers
  light stabilizers, for example UV absorbers or sterically hindered amines The fillers may be reinforcing or non-reinforcing. Particular mention should be made here of silicon dioxides (spherical, acicular or irregular, such as the fumed silicas), sheet silicates, calcium carbonates, zinc oxides, titanium dioxides, aluminum oxides or aluminum oxide hydroxides.

The composition contains the at least one compound (d) preferably in a total amount of 0.1 to 5 parts by weight, especially of 0.1 to 2 parts by weight, based in each case on (a)+ (b)+ (c)=100.

The enumerated polymers and compounds (d) need not necessarily be present in the composition; the composition may thus also contain 0 parts by weight, based on (a)+ (b)+ (c)=100, of further polymers and compounds (d).

The composition of the invention is foamed in a preferred embodiment. The foaming is effected by the introduction and subsequent expansion of microballoons.

In principle, foams can be produced in two ways: firstly by the action of a blowing gas, whether added or resulting from a chemical reaction, and secondly by the incorporation of hollow spheres into the material matrix. Foams produced by the latter route are referred to as syntactic foams.

Physical blowing agents that are useful in the present application are naturally occurring atmospheric materials that are gaseous at the temperature and pressure at which the foam emerges from the nozzle. Physical blowing agents may be introduced, i.e. injected, into the mixed polymer material in the form of a gas, supercritical fluid or liquid. The choice of physical blowing agent used depends on the desired properties in the resulting foams. Other factors that are taken into account in the selection of a blowing agent are its toxicity, vapor pressure profile, ease of handling and solubility in relation to the polymeric materials used. It is possible to use inflammable blowing agents such as pentane, butane and other organic materials such as hydrofluorocarbons and hydrochlorofluorocarbons, but preference is given to noncombustible, nontoxic, non-ozone-degrading blowing agents because they are easier to use, for example because fewer concerns exist with regard to the environment, etc. Suitable physical blowing agents are, for example, carbon dioxide, nitrogen, $SF_6$, nitrogen oxides, perfluorinated liquids such as $C_2F_6$, noble gases such as helium, argon and xenon, air (typically a mixture of nitrogen and oxygen), and mixtures of these materials.

It is alternatively also possible to use chemical blowing agents in the foam. Suitable chemical blowing agents include a mixture of sodium bicarbonate and citric acid, dinitrosopentamethylenetetramine, p-toluenesulfonyl hydrazide, 4,4'-oxybis(benzenesulfonyl hydrazide), azodicarbonamide (1,1'-azobisformamide), p-toluenesulfonyl semicarbazide, 5-phenyltetrazole, 5-phenyltetrazole analogs, diisopropyl hydrazodicarboxylate, 5-phenyl-3,6-dihydro-1,3,4-oxadiazin-2-one and sodium borohydride.

In a syntactic foam, hollow microbeads such as glass beads or ceramic hollow beads or microballoons are incorporated in the composition. This means that, in a syntactic foam, the cavities are separated from one another and the substances present in the cavities (gas, air) are divided from the surrounding matrix by a membrane.

Compositions foamed with hollow microbeads feature a defined cell structure with a homogeneous size distribution of the foam cells. Hollow microbeads afford closed-cell foams without cavities which, by comparison with open-cell variants, have features including better sealing action against dust and liquid media. Furthermore, chemically or physically foamed materials are more prone to irreversible collapse under pressure and at high temperature, and frequently show lower cohesive strength.

Particularly advantageous properties can be achieved when microbeads used for foaming are expandable microbeads (also referred to as "microballoons"). By virtue of their flexible thermoplastic polymer shell, foams of this kind have higher conformability than those filled with unexpandable nonpolymeric hollow microbeads (for example hollow glass beads). They are better suited to compensate for manufacturing tolerances, as are commonly encountered in the case of injection moldings, for example, and can also better compensate for thermal stresses on account of their foam character.

The foaming is therefore preferably effected in each case by the introduction and subsequent expansion of microballoons, meaning that the self-adhesive mass composition is preferably foamed with microballoons.

"Microballoons" are understood to mean elastic hollow microbeads that are thus expandable in their ground state, having a thermoplastic polymer shell. These beads are filled with low-boiling liquids or liquefied gas. Shell materials used are especially polyacrylonitrile, PVDC, PVC or polyacrylates. Suitable low-boiling liquids are especially hydrocarbons from the lower alkanes, for example isobutane or isopentane, that are enclosed in the polymer shell in the form of liquefied gas under pressure.

Action on the microballoons, especially by the action of heat, softens the outer polymer shell. At the same time, the liquid blowing gas present in the shell is converted to its gaseous state. This expands the microballoons irreversibly and three-dimensionally. The expansion has ended when the internal pressure and external pressure are equal. Since the polymer shell is maintained, a closed-cell foam is thus achieved.

A multitude of unexpanded types of microballoon is commercially available, which are differentiated essentially by their size and their starting temperatures required for expansion (75 to 220° C.). One example of commercially available unexpanded microballoons is that of the Expancel® DU types (DU=dry unexpanded) from Akzo Nobel. In the type designation Expancel xxx DU yy (Dry unexpanded), "xxx" represents the composition of the microballoon blend, and "yy" the size of the microballoons in the expanded state.

Unexpanded microballoon types are also available in the form of an aqueous dispersion having a solids content or microballoon content of about 40% to 45% by weight, and also in the form of polymer-bound microballoons (masterbatches), for example in ethylene-vinyl acetate with a microballoon concentration of about 65% by weight. Both the microballoon dispersions and the masterbatches, like the DU types, are suitable for production of a foamed self-adhesive composition of the invention.

A foamed composition may also be produced with what are called pre-expanded microballoons. In the case of this group, expansion already takes place prior to mixing into the polymer matrix. Pre-expanded microballoons are commercially available, for example, under the Dualite® name or with the type designation Expancel xxx DE yy (Dry Expanded) from Akzo Nobel. "xxx" represents the composition of the microballoon blend; "yy" gives the size of the microballoons in the expanded state.

In the processing of already expanded microballoon types, it may be the case that the microballoons have a tendency to flotation on account of their low density in the composition into which they are to be incorporated, i.e. float "upward" in the composition during the processing operation. This leads to irregular distribution of the microballoons in the layer. In the upper region of the layer (z direction), more microballoons are encountered than in the lower region of the layer, such that a density gradient is established over the layer thickness.

In order to largely or virtually completely prevent such a density gradient, preference is given in accordance with the invention to incorporating microballoons that have only been lightly pre-expanded, if at all, into the composition. Only after incorporation into the layer are the microballoons expanded. This results in a more uniform distribution of the microballoons in the composition.

The microballoons are preferably chosen in such a way that the ratio of the density of the composition to the density of the (non-pre-expanded or only lightly pre-expanded) microballoons to be incorporated into the composition is between 1 and 1:6. In that case, expansion is effected only after or directly on incorporation. In the case of solvent-containing compositions, the microballoons are preferably expanded only after incorporation, coating, drying (solvent evaporation). Preference is therefore given in accordance with the invention to using DU types.

According to the invention, the average diameter of the cavities formed by the microballoons in the foamed composition is preferably 20 to 150 μm, more preferably 20 to 50 μm, for example 40 to 45 μm. In the range from 20 to 50 μm, the microballoons lead to particularly high shock resistances of the cured pressure-sensitive adhesives produced in accordance with the invention.

Since the diameters of the cavities formed by the microballoons in the foamed compositions are being measured here, the diameters are those diameters of the cavities formed by the expanded microballoons. The average diameter means the arithmetic average diameter of the cavities formed by the microballoons in the composition.

If foaming is effected by means of microballoons, the microballoons may be supplied to the formulation in the form of a masterbatch, paste or blended or neat powder. In addition, they may be suspended in solvents.

The proportion of the microballoons in the composition, in a preferred embodiment of the invention, is up to 12 parts by weight, preferably between 0.25 part by weight and 5 parts by weight, more preferably between 0.5 and 4 parts by weight, even more preferably between 1 and 3.5 parts by weight, and especially 2.0 to 3.0 parts by weight, based in each case on (a)+ (b)+ (c)=100. Within these ranges, it is possible to provide cured pressure-sensitive adhesives that typically have a particularly good balance between adhesion and cohesion.

A composition containing expandable hollow microbeads may additionally also contain non-expandable hollow microbeads. All that matters is that virtually all gas-containing caverns are closed by a permanently impervious membrane, no matter whether this membrane consists of an elastic and thermoplastically extensible polymer mixture or, for instance, of elastic glass that is non-thermoplastic over the spectrum of temperatures possible in plastics processing.

Also suitable for the composition—chosen independently of other additives—are solid polymer beads, hollow glass beads, solid glass beads, ceramic hollow beads, solid ceramic beads and/or solid carbon beads ("carbon microballoons").

The absolute density of a foamed composition is preferably 400 to 990 kg/m$^3$, more preferably 450 to 800 kg/m$^3$, even more preferably 500 to 700 kg/m$^3$ and especially 500 to 600 kg/m$^3$.

Relative density describes the ratio of the density of the foamed composition to the density of the unfoamed composition of the same recipe. The relative density of the composition is preferably 0.35 to 0.99, more preferably 0.45 to 0.97, especially 0.50 to 0.90.

A preferred composition for producing the cured pressure-sensitive adhesive comprises:
a) at least one solid acrylonitrile-butadiene rubber,
b) at least one tackifier resin and
c) at least one liquid acrylonitrile-butadiene rubber.

A further preferred composition for production of the cured pressure-sensitive adhesive consists of:
a) at least one solid acrylonitrile-butadiene rubber,
b) at least one tackifier resin and
c) at least one liquid acrylonitrile-butadiene rubber.

Solid and liquid acrylonitrile-butadiene rubbers and tackifier resins used are preferably the aforementioned preferred compounds in the stated total amounts.

The present invention secondly relates to a cured pressure-sensitive adhesive obtained or obtainable by the method of the invention.

In relation to preferred embodiments of the cured pressure-sensitive adhesive, the statements made with regard to the method of the invention are applicable mutatis mutandis.

The present invention thirdly relates to a single- or double-sided adhesive tape comprising a cured pressure-sensitive adhesive of the invention on a carrier layer.

The general expression "adhesive strip" (pressure-sensitive adhesive strip), also referred to synonymously as "adhesive tape" (pressure-sensitive adhesive tape), in the context of this invention includes all two-dimensional structures such as films or film sections that extend in two dimensions, tapes having extended length and limited width, tape sections and the like, and lastly also diecuts or labels.

The adhesive tape thus has a longitudinal extent (x direction) and a lateral extent (y direction). The adhesive tape also has a thickness (z direction) running at right angles to the two extents, where the lateral extent and longitudinal extent are several times greater than the thickness. The thickness is very substantially equal, preferably exactly equal, over the entire two-dimensional extent of the pressure-sensitive adhesive strip determined by the length and width.

Preferably, all layers of the adhesive tape have essentially the shape of a cuboid. Further preferably, all layers are bonded to one another over their full area. This bond may be optimized by the pretreatment of the film surfaces.

The adhesive tape of the invention is especially in elongate sheet form. An elongate sheet is understood to mean an object having a length (extent in x direction) several times greater than the width (extent in y direction), and where the width over the entire length is approximately and preferably exactly the same.

Typical finished forms of the adhesive tape of the invention are adhesive tape rolls in any conceivable size, spools having a long length and various widths, bales, bars and adhesive strips, as obtained, for example, in the form of diecuts.

Preference is given to diecuts in all conceivable sizes and shapes, for example in the form of a solid diecut with identical or different edge lengths, round or sharp edges or else specially adapted forms, but also in the form of diecut frames in all conceivable sizes, shapes and frame widths. The size of the diecut can be used to adjust the holding power of the individual connection site. The diecuts may lie directly on the liner without being covered by a further liner on the other side, and are sent as such to the processing. In this case, the component should be processed further directly. Alternatively, the diecuts may have been provided on the open side with an additional matched liner with or without a finger-tab. In this case, storage, dispatch or the like may take place.

It is generally an option to apply diecuts or to bond them to components by means of machine-automated processes. In this case, it is possible to remove any liner still present if required.

In addition, the adhesive tape may already have been cut into segments on rolls, as for example for installation of cabling in the automotive sector. This enables individual pieces to be pulled off from the liner. By contrast with the customary diecuts, however, the pieces here are adjacent on the liner and hence always rectangular.

The carrier layer includes all two-dimensional structures, for example films or film sections that extend in two dimensions, tapes of extended length and limited width, tape sections, diecuts (for example in the form of outlines or boundaries of an (opto) electronic arrangement), multilayer arrangements and the like. For various applications, it is possible to combine a wide variety of different carrier layers, for example films, woven and nonwoven fabrics, and papers, with the adhesives.

Carrier layers used in the present context are preferably polymer films, film composites, or films or film composites provided with organic and/or inorganic layers. Such films/film composites may consist of any standard plastics used for film production, by way of example but not limited to: polyethylene, polypropylene-especially oriented polypropylene (OPP) produced by mono- or biaxial stretching, cyclic olefin copolymers (COC), polyvinylchloride (PVC), polyester-especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyether sulfone (PES) or polyimide (PI). Particular preference is given to using PET as carrier layer.

The carrier layer may additionally be combined with organic or inorganic coatings or layers. This can be accomplished by standard methods, for example painting, printing, vapor deposition, sputtering, coextrusion or lamination. Nonlimiting examples here include, for instance, oxides or nitrides of silicon and aluminum, indium tin oxide (ITO) or sol-gel coatings.

If required, prior to the application of the composition to the carrier layer, a primer layer may be applied, especially in a solvent-free manner, for example by coextrusion, such that a primer layer is present between the carrier layer and a pressure-sensitive adhesive. Usable primers include the known dispersion and solvent systems, for example based on isoprene- or butadiene-containing rubbers and/or cyclo rubbers. Isocyanates or epoxy resins as additives improve adhesion, and in some cases also increase the shear strength of the cured pressure-sensitive adhesive. Physical surface treatments such as flame treatment, corona or plasma, or coextrusion layers, are likewise suitable for improving adhesion. Particular preference is given to the utilization of the aforementioned methods when solvent-free compositions are used, especially those based on acrylate. Descriptions of the customary primers can be found, for example, in "Handbook of Pressure Sensitive Adhesive Technology", D. Satas, (3rd edition).

In addition, the reverse or top side of the carrier layer, i.e. that opposite the adhesive side, may be subjected to an anti-adhesive physical treatment or coating, especially with a separating agent or release agent (optionally blended with other polymers). Examples are stearyl compounds (for example polyvinyl stearyl carbamate, stearyl copolymers of transition metals such as Cr or Zr, ureas formed from polyethyleneimine and stearyl isocyanate or polysiloxanes.

The term "stearyl" is synonymous for all straight or branched alkyls or alkenyls having a carbon number of at least 10, for example octadecyl. Suitable separating agents also include surfactant release systems based on long-chain alkyl groups, such as stearyl sulfosuccinates or stearyl sulfosuccinamates, but also polymers that may be selected from the group consisting of polyvinyl stearyl carbamates, for example Escoat 20 from Mayzo, polyethyleneimine stearyl carbamides, chromium complexes of $C_{14}$ to $C_{28}$ fatty acids and stearyl copolymers as described, for example, in DE 28 45 541 A. Likewise suitable are separating agents based on acrylic polymers having perfluorinated alkyl groups, silicones, for example based on poly(dimethylsiloxanes) or fluorosilicone compounds.

Adhesive tapes of the invention that have been coated with adhesives on one or both sides are usually wound at the end of the production process to give a roll in the form of an Archimedean spiral. In order to prevent the pressure-sensitive adhesives from coming into contact with one another in the case of double-sided adhesive tapes, or in order to assure easier unrolling in the case of single-sided adhesive tapes, the adhesive is covered with a cover material (also referred to as release material) prior to the winding of the adhesive tape. The person skilled in the art knows such cover materials by the name of release liner or liner. As well as the covering of single- or double-sided adhesive tapes, liners are also used to cover labels. A liner (release paper, release film) is not part of a pressure-sensitive adhesive strip, but merely an aid for production and storage thereof and/or for further processing by diecutting. Furthermore, a liner, by contrast with an adhesive tape carrier, is not firmly bonded to an adhesive layer. The release liners additionally ensure that the adhesive is not soiled prior to use. In addition, release liners can be adjusted via the type and composition of the release materials such that the adhesive tape can be unrolled with the desired force (light or heavy). In the case of adhesive tapes double-sidedly coated with adhesive, the release liners additionally ensure that the correct side of the adhesive is exposed first in the unrolling operation.

The liner (release paper, release film) is not part of the adhesive tape, but merely an aid for the production and storage thereof or for further processing by diecutting. If a double-sided adhesive tape provided with a liner is unrolled, it is normally applied to a substrate by the open, i.e. liner-free, pressure-sensitive adhesive side. At the same time, the other pressure-sensitive adhesive side still adheres to the coated surface of the liner to a sufficient degree to enable handling of the adhesive tape.

In order to facilitate the removal of a release liner from the adhesive tape that generally takes place directly prior to application, the liners are occasionally provided with gripping aids, called "tabs", on their reverse side (the unrolling side). This makes it easier to pull the liner off in that it is not necessary first to penetrate between liner and adhesive in order to be able to grip a piece of liner and subsequently to be able to pull the liner further off; instead, it is sufficient to grip the tab to be able to remove the liner without difficulty. For this purpose, the tabs are welded or stuck onto the reverse side of the liner in such a way that a grippable part of the tab is not bonded to the liner but protrudes from its surface or lies loose thereon. Gripping aids of this kind are described, for example, in EP 2 426 185 A1.

Double-sided adhesive tapes, if required, are wound up to give a cross-wound longitudinal roll, also called spool, and therefore frequently provided with a further release liner on one side in the production and storage thereof. This further release liner, frequently referred to as "auxiliary liner" or else as "interliner", generally has an overlap at either side by comparison with the width of the adhesive tape and can therefore prevent, inter alia, sticking of the lateral edges of the wound adhesive tape to one another, also called blocking.

Release liners typically consist of at least one anti-adhesive layer, also referred to as "separation layer", in order to reduce the tendency of adhering products to adhere to these surfaces (separation-active function). This layer may be applied to a carrier material. Carrier materials used for the liner may especially be papers or films. Films used are preferably those composed of biaxially stretched polyethylene terephthalate, polybutene, polypropylene, polyethylene, monoaxially stretched polypropylene, biaxially stretched polypropylene or polyethylene, more preferably polyolefin films (polypropylene and polyethylene films) or polyester films. Also encountered are polymer-coated papers or nonwovens.

Separation layers used may be any of the systems known to the person skilled in the art, especially those mentioned in the "Handbook of Pressure Sensitive Adhesive Technology" by Donatas Satas (Satas & Associates, Warwick 1999). According to the prior art, the material of the anti-adhesive separation layer is preferably selected from the group comprising silicones, fluorinated silicones, silicone copolymers, waxes, carbamates, fluoropolymers, poly- and oligoacrylates that have been modified with hydrophobic side chains, polyolefins and mixtures of two or more of the substances mentioned.

The adhesive tape of the invention may be a double-sided adhesive tape comprising a cured pressure-sensitive adhesive of the invention as defined above and a heat-activatable adhesive layer, wherein the cured pressure-sensitive adhesive layer is covered with a release liner. Such double-sided adhesive tapes with a heat-activatable adhesive layer are generally wound up to give a cross-wound longitudinal roll or coil as described above, generally with the interliner on the heat-activatable layer side.

Various product constructions are conceivable with regard to the adhesive tape. There is always at least one cured pressure-sensitive adhesive of the invention. The cured pressure-sensitive adhesive may have a thickness of 10 to 1000 µm, preferably 15 to 500 µm, more preferably 15 µm to 300 µm, even more preferably 20 µm to 300 µm, even more preferably 20 to 200 µm, especially 20 to 150 µm, for example 20 to 100 µm. The adhesive tape may include further layers, for example further adhesive layers. In addition, nontacky layers, which is especially understood to mean carrier layers of low extensibility ($\varepsilon_{max}$<100%) or extensible carrier layers ($\varepsilon_{max}$ at least 100%), may be included in the adhesive tape.

The coat weight (coating thickness) of the cured pressure-sensitive adhesive is preferably between 10 and 150 g/m², further preferably between 15 and 100 g/m², most preferably between 20 and 35 g/m².

The pressure-sensitive adhesive tape is formed in that the composition is applied to part of or the entire carrier area and then is cured by electron beam irradiation (EBI). The coating can also be effected in the form of one or more strips in longitudinal direction (machine direction), optionally in transverse direction, but is especially effected over the full area. In addition, the composition may be applied in a dot pattern by means of screen printing, in which case the adhesive dots may also be of different size and/or in a different distribution, by intaglio printing in in longitudinal and transverse direction coherent lands, by halftone printing or by flexographic printing. The composition may be in the form of domes (produced by screen printing) or else in a different pattern, such as lattices, strips, zigzag lines. In addition, for example, it may also have been applied by spraying, which results in a more or less irregular application pattern.

It is advantageous to use an adhesion promoter, called a primer layer, between carrier and composition, or a physical pretreatment of the carrier surface for improvement of the adhesion of the composition on the carrier.

Usable primers are the known dispersion and solvent systems, for example based on isoprene- or butadiene-containing rubber, acrylate rubber, polyvinyl, polyvinylidene and/or cyclo rubber. Isocyanates or epoxy resins as additives improve adhesion, and in some cases also increase the shear strength of the pressure-sensitive adhesive. The adhesion promoter may likewise be applied to one side of the carrier film by means of a coextrusion layer. Examples of suitable physical surface treatments include flame treatment, corona or plasma, or coextrusion layers.

Moreover, the carrier material may have been pretreated or may be aftertreated. Standard pretreatments are hydrophobization, corona pretreatments such as N2 corona or plasma pretreatments; standard aftertreatments are calendering, tempering, laminating, diecutting and enveloping.

The adhesive tape may likewise have been laminated with a commercial separation film or paper which typically of a base material such as polyethylene, polypropylene, polyester or paper that has been single- or double-sidedly coated with polysiloxane.

The adhesive tape of the invention may be produced by customary coating methods known to the person skilled in the art. The pressure-sensitive adhesive here, including the additives, dissolved in a suitable solvent, may be coated here onto a carrier film or separation film, for example by means of engraved roll application, comma bar coating, multiroll coating or by a printing method, and then the solvent can be removed in a drying tunnel or oven. Alternatively, the carrier film or separation film can also be coated by a solvent-free method. For this purpose, the acrylonitrile-butadiene rubber and the tackifier resin are heated and melted in an extruder. Further process steps such as mixing with the additives described, filtration or degassing can be effected in the extruder. The melt is then coated onto the carrier film or separation film by means of a calender.

The pressure-sensitive adhesive tape of the invention preferably has a peel adhesion on a steel substrate of at least 6.0 N/cm at a coat weight of 50 g/m².

With regard to further preferred embodiments of the adhesive tape of the invention, especially with regard to the cured pressure-sensitive adhesive, the statements made with regard to the method of the invention and with regard to the cured pressure-sensitive adhesive of the invention are applicable mutatis mutandis.

The present invention fourthly provides a double-sided adhesive tape comprising a cured pressure-sensitive adhesive of the invention, wherein the double-sided adhesive tape is especially in carrier-free configuration.

With regard to further preferred embodiments of the adhesive tape of the invention, especially with regard to the cured pressure-sensitive adhesive, the statements made with regard to the method of the invention, with regard to the cured pressure-sensitive adhesive of the invention and with regard to the single- or double-sided adhesive tape of the invention are applicable mutatis mutandis.

Finally, the present invention further provides for the use of a cured pressure-sensitive adhesive of the invention or of an adhesive tape of the invention for bonding of components in electronic devices, especially in mobile electronic devices, preferably tablets, mobile phones or smartwatches.

With regard to further preferred embodiments of the use of the invention, especially with regard to the cured pressure-sensitive adhesive and the adhesive tape, the statements made with regard to the method of the invention, with regard to the cured pressure-sensitive adhesive of the invention and with regard to the adhesive tape of the invention are applicable mutatis mutandis.

The invention especially relates to the following embodiments:

In a first embodiment, the present invention relates to a method of producing a cured pressure-sensitive adhesive from a composition comprising
- a) at least one solid acrylonitrile-butadiene rubber
- b) at least one tackifier resin and
- c) optionally at least one liquid acrylonitrile-butadiene rubber, characterized in that the composition is subjected to electron beam irradiation (EBI) with an acceleration voltage of 90 to 119 KV and a total radiation dose of 5 to 50 kGy to obtain the cured pressure-sensitive adhesive.

In a second embodiment, the present invention relates to a method according to embodiment 1, characterized in that the acceleration voltage is 95 to 115 kV, preferably 98 to 112 kV, especially 100 kV.

In a third embodiment, the present invention relates to a method according to either of embodiments 1 and 2, characterized in that the total radiation dose is 5 to 40 kGy, preferably 5 to 30 kGy, more preferably 5 to 20 kGy, especially 15 kGy.

In a fourth embodiment, the present invention relates to a method according to any of the preceding embodiments, characterized in that the at least one solid acrylonitrile-butadiene rubber (a) has an acrylonitrile content of 20% to 40% by weight, preferably of 20% to 30% by weight, especially of 20% to 25% by weight, based in each case on the total weight of the solid acrylonitrile-butadiene rubber.

In a fifth embodiment, the present invention relates to a method according to any of the preceding embodiments, characterized in that the at least one solid acrylonitrile-butadiene rubber (a) has a glass transition temperature $T_g$ of less than $-30°$ C., preferably of less than $-35°$ C., more preferably of less than $-40°$ C., especially of $-42°$ C., measured by means of DSC to DIN 53 765:1994, section 7.1, note 1.

In a sixth embodiment, the present invention relates to a method according to any of the preceding embodiments, characterized in that the composition contains the at least one solid acrylonitrile-butadiene rubber in a total amount of 50 to 80 parts by weight, preferably of 55 to 75 parts by weight, especially of 62 to 67 parts by weight, where the parts by weight of (a), (b) and (c) are normalized such that (a)+ (b)+ (c) adds up to 100.

In a seventh embodiment, the present invention relates to a method according to any of the preceding embodiments, characterized in that the at least one tackifier resin (b) is a modified aromatic hydrocarbon resin.

In an eighth embodiment, the present invention relates to a method according to any of the preceding embodiments, characterized in that the composition contains the at least one tackifier resin (b), especially the modified aromatic hydrocarbon resin, in a total amount of 20 to 50 parts by weight, preferably of 25 to 45 parts by weight, especially of 27 to 34.5 parts by weight, where the parts by weight of (a), (b) and (c) are normalized such that (a)+ (b)+ (c) adds up to 100.

In a ninth embodiment, the present invention relates to a method according to any of the preceding embodiments, characterized in that the at least one liquid acrylonitrile-butadiene rubber (c) has a glass transition temperature $T_g$ of more than $-30°$ C., preferably of more than $-25°$ C., especially of $-23°$ C., measured by means of DSC to DIN 53 765:1994, section 7.1, note 1.

In a tenth embodiment, the present invention relates to a method according to any of the preceding embodiments, characterized in that the at least one liquid acrylonitrile-butadiene rubber (c) has an acrylonitrile content of 25% to 45% by weight, preferably of 25% to 40% by weight, especially of 28% to 35% by weight, based in each case on the total weight of the liquid acrylonitrile-butadiene rubber.

In an eleventh embodiment, the present invention relates to a method according to any of the preceding embodiments, characterized in that the composition contains the at least one liquid acrylonitrile-butadiene rubber (c) in a total amount of 1 to 10 parts by weight, preferably of 1 to 8 parts by weight, especially of 2.5 to 6 parts by weight, where the parts by weight of (a), (b) and (c) are normalized such that (a)+ (b)+ (c) adds up to 100.

In a twelfth embodiment, the present invention relates to a method according to any of the preceding embodiments, characterized in that the composition contains polymers other than components (a) to (c) in a total amount of 0 to 5 parts by weight, preferably of 0 to 2 parts by weight, especially of 0 parts by weight, based in each case on (a)+ (b)+ (c)=100.

In a thirteenth embodiment, the present invention relates to a method according to any of the preceding embodiments, characterized in that the composition additionally comprises at least one compound (d) selected from the group consisting of aging agents, separating agents, fillers, dyes, plasticizers and mixtures thereof.

In a fourteenth embodiment, the present invention relates to a method according to embodiment 13, characterized in that the composition contains the at least one compound (d) in a total amount of 0.1 to 5 parts by weight, especially of 0.1 to 2 parts by weight, based in each case on (a)+ (b)+ (c)=100.

In a fifteenth embodiment, the present invention relates to a cured pressure-sensitive adhesive obtained or obtainable by a method according to any of embodiments 1 to 14.

In a sixteenth embodiment, the present invention relates to a single- or double-sided adhesive tape comprising a cured pressure-sensitive adhesive according to embodiment 15 on a carrier layer.

In a seventeenth embodiment, the present invention relates to a double-sided adhesive tape comprising a cured pressure-sensitive adhesive according to embodiment 15, wherein the double-sided adhesive tape is especially in a carrier-free configuration.

In an eighteenth embodiment, the present invention relates to the use of a cured pressure-sensitive adhesive according to embodiment 15 or of an adhesive tape according to embodiment 16 or 17 for bonding of components in electronic devices, especially in mobile electronic devices, preferably tablets, mobile phones or smartwatches.

The present invention is elucidated in detail hereinafter by working examples. Unless stated otherwise, all proportions of components are each based on weight.

Examples

Test Methods

Unless stated otherwise, the measurements are conducted under test conditions of 23±1° C. and 50±5% relative humidity.

Glass Transition Temperature $T_g$

Glass transition temperature is reported as a result of measurements by means of dynamic scanning calorimetry (DSC) according to DIN 53 765:1994, especially sections 7.1 and 8.1, but with uniform heating and cooling rates of 10 K/min in all heating and cooling steps (cf. DIN 53 765:1994, section 7.1, note 1). The sample weight is 20 mg.

Peel Adhesion:

Peel strength (peel adhesion) is tested in accordance with PSTC-1.

A strip of the adhesive tape of width 0.5 cm, consisting of a 23 μm-thick PET film etched with trichloroacetic acid and a 50 μm-thick cured pressure-sensitive adhesive applied thereto, is bonded to the test substrate in the form of an ASTM steel plate by rolling a 4 kg roll over it back and forth five times.

The surface of the steel plate is cleaned with acetone beforehand. The plate is clamped, and the adhesive strip is pulled off by its free end at a speed of 300 mm/minute at a peel angle of 180° using a tensile tester, and the force needed for this purpose is ascertained. The measurement results are reported in N/cm, averaged over three measurements and normalized to the width of the strip in N/cm.

The initial peel adhesion (peel adhesion to steel) was measured directly after the bonding and max. 10 min after the bonding.

For the determination of chemical stability, the bonded specimens were stored under different conditions after the rolling.

First of all, all specimens after bonding were stored at 23° C. and 50% relative humidity for 24 hours.

As blank, specimens were each stored at 65° C. and 90% relative humidity for 72 hours. After the storage, the samples were stored at 23° C. and 50% relative humidity for a further 24 hours and then analyzed.

For determination of chemical stability, the specimens were stored at 65° C. and 90% relative humidity in oleic acid (CAS No. 112-80-1, quality of purity at least >90%). After the storage, the specimens are first rinsed with distilled water and then stored at 23° C. and 50% relative humidity for 24 hours. Only then was the peel adhesion measured as described above. Retention of peel adhesion is calculated by the ratio of the measurement value after storage in oleic acid relative to the blank.

Transverse Impact Strength (DuPont Test in the z Plane):

A square sample in the form of a frame was cut out of the pressure-sensitive adhesive strip to be examined (outer dimensions 33 mm×33 mm; frame width 2.0 mm; inner dimensions (window cutout) 29 mm×29 mm). This sample was stuck to a polycarbonate (PC) frame (outer dimensions 45 mm×45 mm; frame width 10 mm; inner dimensions (window cutout) 25 mm×25 mm; thickness 3 mm). Stuck to the other side of the pressure-sensitive adhesive strip was a PC window of 35 mm×35 mm. PC frame, adhesive tape frame and PC window were bonded in such a way that the geometric centers and the diagonals were each coincident (corner to corner). The bond area was 248 mm². The bond was pressed at 248 N for 5 s and stored for 48 hours under conditions of 23° C./50% relative humidity.

Immediately after storage, the adhesive assembly of PC frame, pressure-sensitive adhesive strip and PC window was clamped by the protruding edges of the PC frame into a sample mount in such a way that the assembly was aligned vertically. The PC frame here lay planar on the protruding edges of the sample mount, such that the PC window was suspended (held by the adhesive tape pattern) beneath the PC frame. The sample mount was then inserted centrally into the holder provided on the DuPont Impact Tester.

The impact head, weighing 150 g, was inserted such that the circular striking geometry with diameter 24 mm lay centrally and flush against the surface of the PC window that was freely accessible from above.

A weight having a mass of 150 g, guided on two guide rods, was dropped from a height of 5 cm (measurement conditions: 23° C., 50% relative humidity) vertically onto the corresponding arrangement of the assembly formed of sample mount, sample, and impact head. The height of the drop weight was increased in steps of 5 cm until the impact energy introduced destroys the sample as a result of the transverse impact load, and the PC window parted from the PC frame.

In order to be able to compare trials with different samples, the energy was calculated as follows:

$$E[J] = \text{height } [m] * \text{mass of weight } [kg] * 9.81 \ kg/m*s^2$$

Five samples per product were tested, and the mean energy value was reported as the characteristic number for the transverse impact strength.

Push-Out Resistance (z Plane):

By means of the push-out test, it is possible to obtain conclusions as to the level of stability of a bond of a component in a frame-like body, for example a window or display in a housing.

A rectangular sample in the form of a frame was cut out of the adhesive tape to be examined (external dimensions 43 mm×33 mm; frame width in each case 2.0 mm; internal dimensions (window cutout) 39 mm×29 mm, bond area on the top and bottom side 288 mm² in each case). This sample was bonded to a rectangular ABS polymer frame (ABS=acrylonitrile-butadiene-styrene copolymer) (external dimensions 50 mm×40 mm, border width of each of the long borders 8 mm; border width of each of the short borders 10 mm; internal dimensions (window cutout) 30 mm×24 mm; thickness 3 mm). A rectangular PMMA sheet (PMMA=polymethylmethacrylate) with dimensions of 45 mm×35 mm was bonded to the other side of the sample of the double-sided adhesive tape. The full available bond area of the adhesive tape was utilized. The bonding of ABS frame, adhesive tape sample and PMMA window was effected such that the geometric centers, the angle bisectors of the acute diagonal angles and the angle bisectors of the obtuse diagonal angles of the rectangles were each coincident (corner-to-corner, long sides on long sides, short sides on short sides). The bond area was 288 mm². The bond was subjected to a pressure of 10 bar at 23° C. for 5 s and stored under conditions of 23° C./50% relative humidity for 24 hours.

Immediately after the storage, the adhesive composite composed of ABS frame, adhesive tape and PMMA sheet was placed by the protruding edges of the ABS frame onto a framework (sample holder) such that the composite was aligned horizontally and the PMMA sheet faced downward in a freely suspended manner.

A pressure ram is then moved vertically upward through the window of the ABS frame at a constant speed of 10 mm/s, such that it presses onto the center of the PMMA sheet, and the respective force (determined from the respective pressure and contact area between the ram and sheet) is registered as a function of the time from the first contact of the ram with the PMMA sheet until just before it drops away (test conditions: 23° C., 50% relative humidity). The force acting immediately prior to the failure of the adhesive bond between PMMA sheet and ABS frame (maximum force Fmax in the force-time diagram in N) is registered as the response of the push-out test.

Micro-Shear Travel (MS);

A flat piece measuring 10 mm×50 mm was cut from the pressure-sensitive adhesive tape to be examined, and the resulting adhesive tape specimen was bonded to a polished, heatable steel test plate, which was 13 mm wide and had been cleaned with acetone, with the bonding taking place such that the longitudinal direction of the adhesive tape specimen is oriented in the transverse direction of the steel plate, the bond area has dimensions of l×w=13 mm×10 mm, and the adhesive tape protrudes beyond the steel plate on one side by a section of length z=2 mm. For fixing, a 2 kg steel roller was then rolled over the adhesive tape six times at a speed of 10 m/min. On the side of the adhesive tape facing away from the steel plate, the adhesive tape is reinforced, flush with the edge protruding by the section of length z beyond the steel plate, with a stable adhesive strip (dimensions 4 mm×25 mm; PET film carrier 190 μm thick), which serves as a support for a travel sensor. The arrangement thus prepared is suspended perpendicularly in such a way that the section of length z of the adhesive tape specimen that protrudes beyond the steel plate points upward. The steel test plate with the bonded sample is heated to 40° C., and the adhesive tape specimen to be analyzed is loaded at the lower end with a weight of 100 g or 200 g by means of a clamp at the time t0=0. The travel sensor measures the deformation of the sample under shear over a period of 15 minutes (beginning at t0) at a temperature of 40° C. and a relative humidity of 50±5%. The result reported is the shearing distance in μm after 15 minutes (maximum value; distance traveled by the top edge of the sample downward during the measurement). The shear travel thus measured is a quantitative measure of the internal strength (shear strength) of the sample analyzed.

In a first step, the solid acrylonitrile-butadiene rubber was first subjected to preliminary swelling with the same amount of butanone at 23° C. for 12 hours. Subsequently, this so-called prebatch was kneaded for 2 hours. Subsequently, the amount of butanone chosen above and the liquid NBR rubber were again added in two steps and the mixture was kneaded for 10 min each time. Subsequently, the tackifier resin was added as a solution in butanone with a solids content of 50%, and the mixture was kneaded homogeneously for a further 20 min. The final solids content is adjusted to 30% by weight by addition of butanone.

The respective composition was coated onto a 23 μm-thick, trichloroacetic acid-etched PET film on a commercial laboratory coating bench (for example from SMO (Sondermaschinen Oschersleben GmbH)) with the aid of a coating knife. The butanone was evaporated off at 105° C. in an air circulation drying cabinet for 10 minutes. The gap width in the coating was adjusted so as to achieve a coat weight of 50 g/m² after the solvent had evaporated off. Subsequently, the films that had been freed of the solvent were covered with siliconized PET film and stored at 23° C. and 50% relative humidity until further testing.

For production of the specimens for the ball drop test and push-out test, the respective composition was coated onto a siliconized PET film with the aid of the laboratory coating bench. The coatings were then dried at 105° C. for 10 min. The adhesive layers having a layer thickness of 50 μm were laminated onto both sides of a corona-pretreated 12 μm PET film, so as to result in a double-sided adhesive tape specimen.

For the electron beam irradiation, a system from ELECTRON CROSSLINKING AB (Halmstad, Sweden) was used. The acceleration voltage per 1 μm of layer thickness of the composition was 2 kV or 2.4 kV; the total radiation dose in each case was 15 kGy. The composition was subjected to electron irradiation from both sides, i.e. symmetrically, in order to assure uniform curing. Prior to the irradiation, the liner was removed in each case from the side to be irradiated.

|  |  | H1 no ESH | gH2* 15 kGy 100 kV | gH3 15 kGy 120 kV | H4 no ESH | gH5* 15 kGy 100 kV | gH6 15 kGy 120 kV | H7 no ESH | gH8* 15 kGy 100 kV | gH9 15 kGy 120 kV |
|---|---|---|---|---|---|---|---|---|---|---|
| Composition | Nipol N 917[1] |  | 64.5 |  |  | 63.5 |  |  | 65.1 |  |
|  | Picco AR 100[2] |  | 32.3 |  |  | 33.3 |  |  | 30 |  |
|  | Nipol 1312 LV[3] |  | 3.2 |  |  | 3.2 |  |  | 4.9 |  |
| Measurement results | peel ASTM [N/cm] | 5.5 | 5.1 | 5.3 | 6.0 | 5.0 | 4.7 | 6.2 | 4.5 | 4.5 |
|  | peel PP [N/cm] |  | 1.7 | 1.8 |  | 2.1 | 1.8 |  | 2.1 | 2.5 |
|  | control value [N/cm] | 8.6 | 9.5 | 8.9 | 9.9 | 9.4 | 10.3 | 11.4 | 11.2 | 11.2 |
|  | oleic acid | 6.1 | 6.2 | 5.5 | 5.4 | 5.9 | 5.4 | 5.6 | 6.8 | 6.6 |
|  | retention | 71.0% | 65.5% | 62.0% | 54.3% | 62.8% | 52.3% | 49.2% | 60.6% | 58.7% |
|  | MS max [μm] | 271 | 161 | 170 | 239 | 224 | 204 | 303 | 201 | 141 |
|  | MS min [μm] | 120 | 48 | 53 | 98 | 91 | 71 | 140 | 65 | 38 |
|  | MS-delta [μm] | 151 | 112 | 117 | 141 | 134 | 133 | 163 | 136 | 104 |
|  | elastic ratio | 56% | 70% | 69% | 59% | 60% | 65% | 54% | 68% | 73% |
|  | DuPont Z [J] | 0.486 | 0.456 | 0.309 | 0.412 | 0.441 | 0.471 | 0.500 | 0.441 | 0.412 |
|  | Push Out [N] | 143 | 166 | 154 | 146 | 151 | 149 | 179 | 125 | 161 |

*inventive
[1]Solid acrylonitrile-butadiene rubber, acrylonitrile content 23% by weight, glass transition temperature $T_g$ −42° C.
[2]Hydrocarbon resin obtainable by copolymerization of at least one monomer having 5 carbon atoms with at least one aromatic monomer
[3]Liquid acrylonitrile-butadiene rubber, acrylonitrile content 28% by weight, glass transition temperature $T_g$ −25° C.

Production of the Cured Pressure-Sensitive Adhesives

The compositions detailed in the examples were homogenized in the form of solvent-based masses in a kneader with double-sigma kneading hooks. The solvent used was butanone (methyl ethyl ketone, 2-butanone). The kneader was cooled by means of water cooling.

As is apparent from the examples, the curing of the composition by means of electron beam irradiation with an acceleration voltage of 100 kV and a radiation dose of 15 kGy (gH2, gH5, gH8), after storage in oleic acid at 65° C. for 72 hours, leads to significantly better peel adhesion than compositions that have either not been cured by means of electron beam irradiation (H1, H4, H7) or that have been cured using a higher acceleration voltage of 120 kV (gH3, gH6, gH9). The chemical mentioned (oleic acid) is merely representative here. The pressure-sensitive adhesives of the invention are likewise resistant to chemicals such as sebum, perfumes, dilute sulfuric acid, oil/water emulsions and water/oil emulsions as used in cosmetic products, and brake fluid. This list too should not be considered to be conclusive, but has illustrative character.

By irradiation with a particular acceleration voltage, it is additionally also possible to improve the push-out value, but without significantly worsening shock resistance. By increasing the amount of the aromatic modified hydrocarbon resin (Pico AR 100) it is even possible to increase shock resistance (cf. H4 and gH5). Furthermore, irradiation with a particular acceleration voltage can increase shear strength.

It is surprising, and unforeseeable to the person skilled in the art, that the improvement in resistance to oleic acid and the improvement in push-out value are achieved with simultaneously high shock resistance and shear resistance only when particular acceleration voltages are used in curing by EBI. Increasing the acceleration voltage leads both to a deterioration in chemical resistance and to a deterioration in shock resistance.

The values measured for the push-out test demonstrate excellent suitability of the cured pressure-sensitive adhesives of the invention for bonding of windows or displays in housings. What is particularly surprising here is the shock resistance determined in the ball drop test.

The invention claimed is:

1. A method of producing a cured pressure-sensitive adhesive from a composition comprising:
   a) at least one solid acrylonitrile-butadiene rubber,
   b) at least one tackifier resin, and
   c) optionally at least one liquid acrylonitrile-butadiene rubber, said method comprising subjecting the composition to electron beam irradiation (EBI) with an acceleration voltage per 1 µm of layer thickness of the composition of 1.8 to 2.38 kV and a total radiation dose of 5 to 50 kGy to obtain the cured pressure-sensitive adhesive.

2. The method as claimed in claim 1, wherein the acceleration voltage per 1 µm of layer thickness of the composition is 1.9 to 2.3 kV.

3. The method as claimed in claim 1, wherein the total radiation dose is 5 to 40 kGy.

4. The method as claimed in claim 1, wherein the at least one solid acrylonitrile-butadiene rubber (a) has an acrylonitrile content of 20% to 40% by weight based on a total weight of the solid acrylonitrile-butadiene rubber.

5. The method as claimed in claim 1, wherein the composition contains the at least one solid acrylonitrile-butadiene rubber in a total amount of 50 to 80 parts by weight, where parts by weight of (a), (b) and (c) are normalized such that (a)+ (b)+ (c) adds up to 100.

6. The method as claimed in claim 1, wherein the at least one tackifier resin (b) is a modified aromatic hydrocarbon resin.

7. The method as claimed in claim 1, wherein the composition contains the at least one tackifier resin (b) in a total amount of 20 to 50 parts by weight, where parts by weight of (a), (b) and (c) are normalized such that (a)+ (b)+ (c) adds up to 100.

8. The method as claimed in claim 1, wherein the composition comprises at least one liquid acrylonitrile-butadiene rubber, and the at least one liquid acrylonitrile-butadiene rubber (c) has an acrylonitrile content of 25% to 45% by weight, based on a total weight of the liquid acrylonitrile-butadiene rubber.

9. The method as claimed in claim 1, wherein the composition contains the at least one liquid acrylonitrile-butadiene rubber (c) in a total amount of 1 to 10 parts by weight, where parts by weight of (a), (b) and (c) are normalized such that (a)+ (b)+ (c) adds up to 100.

10. The method as claimed in claim 1, wherein the composition contains polymers other than components (a) to (c) in a total amount of 0 to 5 parts by weight, based on (a)+ (b)+ (c)=100.

11. The method as claimed in claim 1, wherein the composition additionally comprises at least one compound (d) selected from the group consisting of aging agents, separating agents, fillers, dyes, plasticizers, and mixtures thereof, wherein the composition contains the at least one compound (d) in a total amount of 0.1 to 5 parts by weight, based on (a)+ (b)+ (c)=100.

12. A cured pressure-sensitive adhesive obtained by a method as claimed in claim 1.

13. A single - or double-sided adhesive tape, comprising a cured pressure-sensitive adhesive as claimed in claim 12 on a carrier layer.

14. A double-sided adhesive tape comprising a cured pressure-sensitive adhesive as claimed in claim 12, wherein the double-sided adhesive tape is in a carrier-free configuration.

15. A method of bonding a component in an electronic device with an adhesive or an adhesive tape comprising said adhesive, said method comprising applying said adhesive or adhesive tape to said component, wherein the adhesive is a cured pressure-sensitive adhesive as claimed in claim 12.

16. A method of producing a cured pressure-sensitive adhesive from a composition comprising:
   a) 62 to 67 parts by weight of at least one solid acrylonitrile-butadiene rubber based on a total of 100 parts by weight of the composition, wherein the at least one solid acrylonitrile-butadiene rubber has an acrylonitrile content of 20 to 25 percent by weight based on a total weight of the solid acrylonitrile-butadiene rubber;
   b) 27 to 34.5 parts by weight of at least one modified aromatic hydrocarbon tackifier resin based on a total weight of the composition; and
   c) 2.5 to 6 parts by weight of at least one liquid acrylonitrile-butadiene rubber based on a total of 100 parts by weight of the composition, wherein the at least one liquid acrylonitrile-butadiene rubber has an acrylonitrile content of 25 to 35 percent by weight based on a total weight of the liquid acrylonitrile-butadiene rubber;

said method comprising subjecting the composition to electron beam irradiation (EBI) with an acceleration voltage per 1 µm of layer thickness of the composition of 1.8 to 2.38 kV and a total radiation dose of 5 to 50 kGy to obtain the cured pressure-sensitive adhesive.

* * * * *